US010148090B2

(12) United States Patent  
Gillett

(10) Patent No.: US 10,148,090 B2  
(45) Date of Patent: Dec. 4, 2018

(54) HYBRID ENERGY SYSTEM FOR GENERAL APPLICATIONS

(71) Applicant: Carla R. Gillett, Sacramento, CA (US)

(72) Inventor: Carla R. Gillett, Sacramento, CA (US)

(73) Assignee: Carla R. Gillett, Sacramento, CA (US)

( * ) Notice: Subject to any disclaimer, the term of this patent is extended or adjusted under 35 U.S.C. 154(b) by 263 days.

(21) Appl. No.: 15/247,935

(22) Filed: Aug. 26, 2016

(65) Prior Publication Data

US 2017/0012430 A1 Jan. 12, 2017

Related U.S. Application Data

(62) Division of application No. 13/135,416, filed on Jul. 6, 2011, now Pat. No. 9,553,452.

(51) Int. Cl.
*H02J 3/38* (2006.01)
*H02J 3/30* (2006.01)

(52) U.S. Cl.
CPC .............. *H02J 3/30* (2013.01); *H02J 3/382* (2013.01); *H02J 3/383* (2013.01); *H02J 3/386* (2013.01); *Y02B 10/14* (2013.01); *Y02B 10/30* (2013.01); *Y02B 10/70* (2013.01); *Y02E 10/563* (2013.01); *Y02E 10/566* (2013.01); *Y02E 10/763* (2013.01); *Y02E 10/766* (2013.01); *Y02E 60/16* (2013.01); *Y02E 70/30* (2013.01); *Y02P 80/11* (2015.11); *Y02P 80/22* (2015.11); *Y02P 80/23* (2015.11); *Y02P 80/25* (2015.11); *Y10T 307/359* (2015.04)

(58) Field of Classification Search
CPC .... H02J 3/30; H02J 3/383; H02J 3/386; H02J 3/382; Y02P 80/22; Y02P 80/25; Y02P 80/11; Y02P 80/23; Y02B 10/30; Y02B 10/70; Y02B 10/14; Y02E 10/766; Y02E 10/763; Y02E 10/563; Y02E 10/566; Y02E 70/30; Y02E 60/16; Y10T 307/359
See application file for complete search history.

(56) References Cited

U.S. PATENT DOCUMENTS

| 5,492,189 | A | * | 2/1996 | Kriegler | ............... | B60K 6/12 |
| | | | | | | 180/65.23 |
| 6,097,104 | A | * | 8/2000 | Russell | ............... | F03D 9/008 |
| | | | | | | 290/54 |
| 7,132,760 | B2 | * | 11/2006 | Becker | ............... | F03D 3/002 |
| | | | | | | 290/55 |
| 7,215,037 | B2 | * | 5/2007 | Scalzi | ............... | B60K 16/00 |
| | | | | | | 290/55 |
| 8,847,425 | B2 | * | 9/2014 | Jordan, Sr. | ............ | F03D 9/007 |
| | | | | | | 290/55 |

(Continued)

*Primary Examiner* — Michael C Zarroli

(57) ABSTRACT

The Hybrid Energy System for onshore and for offshore applications to include buildings infrastructure, and vessels respectively an assortment one or more arrays of integrated piezoelectric devices, wind turbine array and solar panels characterized in that they are to produce renewable energy for on demand use and for battery bank storage. Accordingly the onshore application includes a kinetic energy turbine farm, and also offshore methods for kinetic energy turbine farms, mega buoys and mega vessels to supply extra electric energy to other vessels and to shunt net power to utility grid companies, and mega-barges produce net power in onboard giant battery bank containers to rent by shipping to utility consignment locations coastally.

15 Claims, 15 Drawing Sheets

(56) References Cited

U.S. PATENT DOCUMENTS

| | | | |
|---|---|---|---|
| 8,981,585 B2* | 3/2015 | Soong | F03B 13/10 |
| | | | 290/54 |
| 9,416,774 B2* | 8/2016 | Jordan, Sr. | F03D 3/061 |
| 9,748,767 B2* | 8/2017 | Tao | H02J 1/102 |
| 2009/0191057 A1* | 7/2009 | Knutson | F03D 3/0481 |
| | | | 416/23 |

* cited by examiner

HYBRID ENERGY SYSTEM FOR GENERAL APPLICATIONS

CROSS REFERENCED TO RELATED APPLICATIONS

A notice of issuance for a divisional patent application number: US20130009469 Filed Jul. 6, 2011 Published Jan. 10, 2013, In: Gillett, and U.S. Pat. No. 8,039,978 B2 Date: Oct. 18, 2011 title: Renewable Energy Power System, In: Gillett, and also U.S. Pat. No. 8,430,192 filed: Jan. 4, 2010 title Robotic Omniwheel Vehicle, In: Gillett.

FIELD

This disclosure relates to a hybrid energy system comprising a first piezoelectric device to integrate with a second wind turbine unit and a third solar panel device accordingly to work as a hybrid energy system or (HES), and an application means for the hybrid energy system arrays to produce hybrid energy based on-shore and off-shore.

BACKGROUND

As related art discloses it is generally well know most hybrid systems only comprise wind and solar arrays for power generating applications sited on-shore and off-shore, whereby, these applications respectively have low renewable energy production with limited percentage value therefore solutions are essential. More specifically, the present application discloses a highly efficient hybrid energy system capable of higher renewable energy production for on demand use and for sending net power to the utility system.

Respectively multiple piezoelectric panels, wind turbine units and solar panel devices can be arranged to set atop arenas, buildings, skyscrapers, on wind parks, urban infrastructures, and set on mega-sized vessels and buoys to capture kinetic energy and solar energy to produce power.

What is needed are alternative hybrid energy production systems providing mega-vessels, mega-barges and mega-buoys. The hybrid vessel systems can include a manual control system, a semi-autonomous system, or a fully autonomous self-driving system to produce net energy and battery storage for consignment.

Presently giant shroud wind turbines are primarily utilized for off shore renewable energy production however the maximum wind force is 55 mph, the turbine shut downs to prevent damage.

SUMMARY

This disclosure offers on-shore and off-shore renewable energy production power plants and hydroelectric energy producing farms. The hybrid energy system for general applications include production sites; buildings, wind parks, vessels, barges, buoys or a combination thereof, or an airplane, a blimp or balloon system homes, buildings and infrastructure, and off-shore aqueducts.

HES for onshore and offshore applications comprises one or more piezoelectric arrays, wind turbine arrays, and solar panel arrays, or a combination thereof to produce electric energy, a power control system including a battery bank system with a battery charging system, a wireless control system, said wireless control system comprising; processors, a wireless controller comprising cell phone satellite communication, and WIFI and global networking, with signaling interface, satellite communication, and I/O wireless communication devices including an array of sensors, receivers, transmitters and cell phone interface linking to said energy system arrays, and a power cable network control system.

DETAILED DESCRIPTION OF THE DRAWINGS

Figure 1:
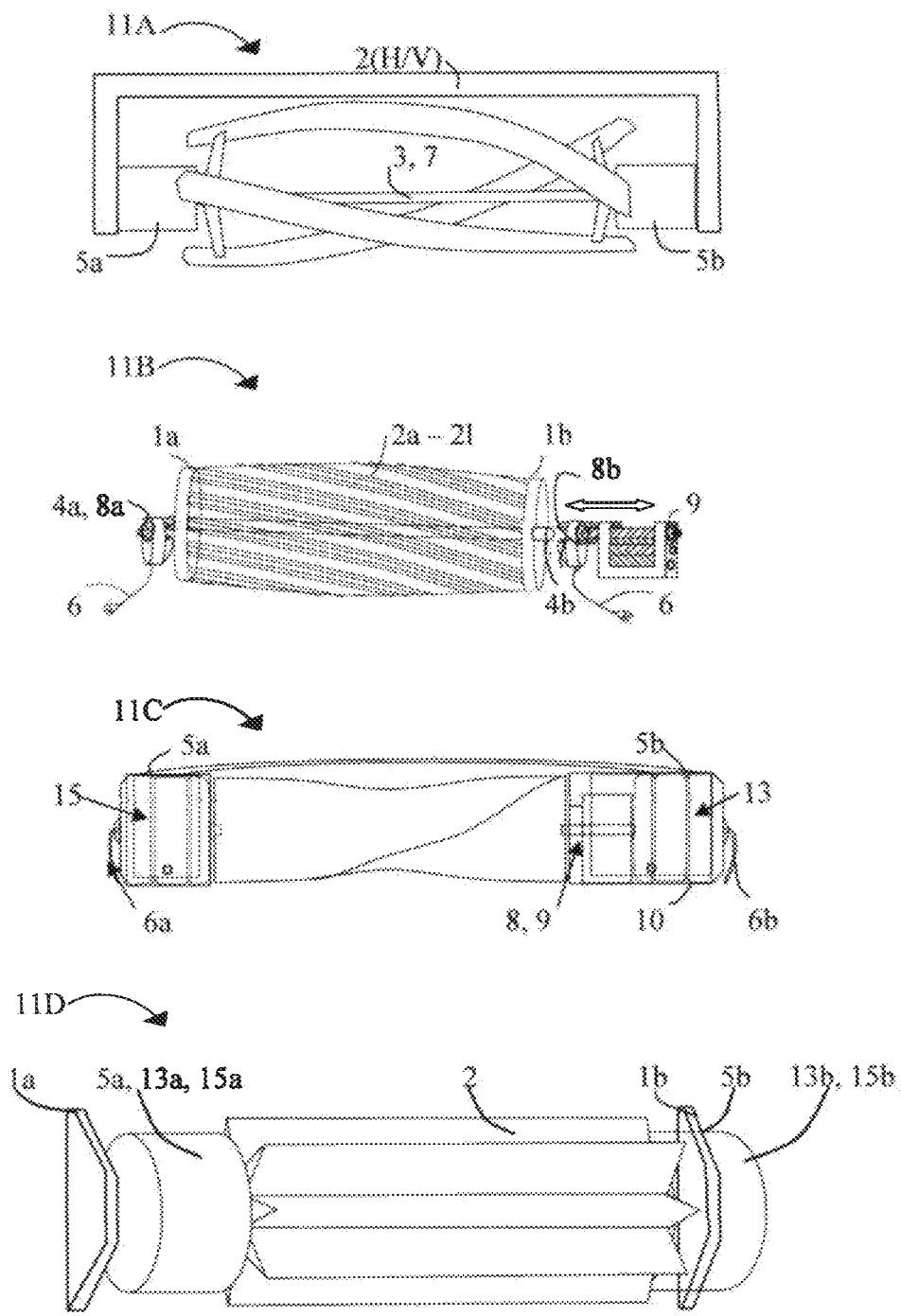
FIG. 1 shows perspective configurations of modular kinetic energy turbines.

Hereinafter, a hybrid energy system will be described in detail with reference to the drawings and the identical parts in the drawings are assigned the same reference numerals.

Figure 2:
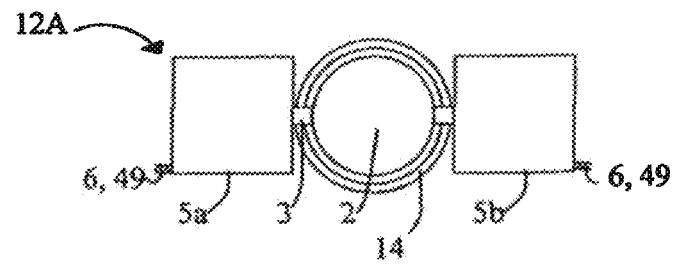
FIG. 2 depicts a flowchart for the hybrid energy system methods of operation.
Figure 2:
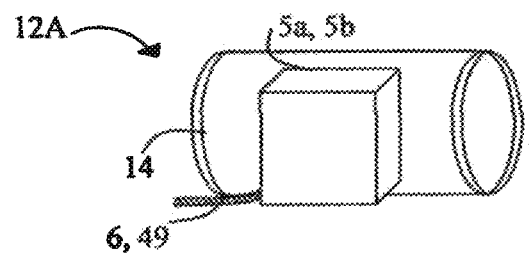
Figure 2:
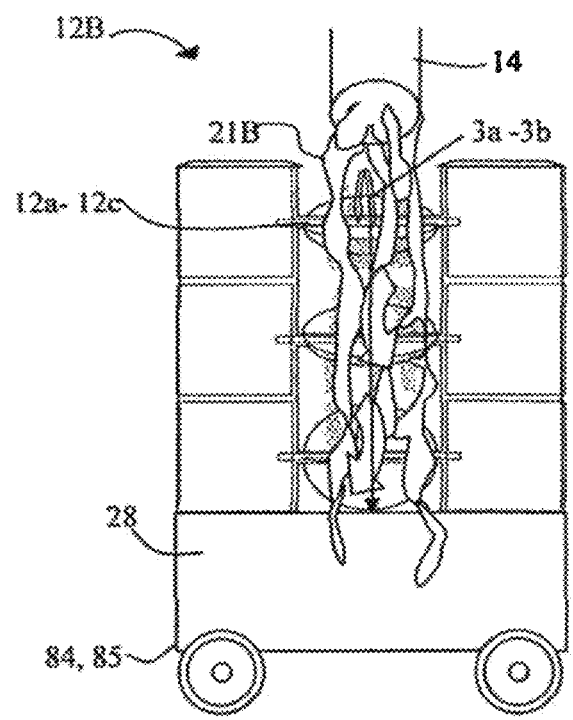

Referring now in greater detail in FIGS. 1A-1D, the hybrid energy system illustrates various configurations for the turbine array supported by a desired framework 1 design which is to support thereon turbine components; axis rod 2, blade 3, shaft 4, generator 5, electrical wiring 6, bearing coupling 7, electromagnetic link coupling 8 for braking, gear box 9, nacelle encasement 10, anchor cable 11, support bracket 12, and controller 13 as FIG. 2 operational functions 1-11.

The HES controller 13 having system functions comprising microchip processors, sensor array, GPS, and the hybrid energy system network comprises cell phone and satellite communication monitors and manages the HES turbine apparatus.

The turbine unit can comprise materials made with preferred materials and electrical components which can be purchased from manufacturer are described herein.

In one aspect the hybrid energy system comprises a hybrid energy system (HES) for onshore and offshore applications comprising, each site can utilize one or more of; a piezoelectric array, a wind turbine array, a solar panel array, or a combination thereof, to produce electric energy.

In one aspect the hybrid energy system comprises one or more on-shore application sites comprising roadways, overpasses, bridges, and tunnels utilizing a grid transmission control system for distributing net power and a shunting subsystem.

In one aspect the hybrid energy system comprises on-shore or off-shore application sites comprising an array of waterproof and sealed piezoelectric devices to generate electric power.

In one aspect the hybrid energy system comprises an onshore or an off-shore application site comprising one or more waterproof and sealed wind turbine units to generate hydroelectric power.

In one aspect the hybrid energy system comprises an underground infrastructure site comprising one or more piezoelectric arrays and wind turbine units to produce electric energy.

In one aspect the hybrid energy system comprises underground infrastructure sites including dams, tunnels, and underground aqueducts.

In one aspect the hybrid energy system comprising a manual control system, a semi-autonomous system, and a fully autonomous self-driving propulsion system.

In one aspect the hybrid energy system comprises a mega-sized vessel comprising an autonomous self-driving system, said autonomous self-driving system further comprising; sonar, LIDAR and RADAR, ultrasonic sensors, an array of video and camera devices, said autonomous self-driving system to monitor and to detect operational functions of said one or more piezoelectric arrays, wind turbine arrays, and solar panel arrays.

In one aspect the hybrid energy system comprises one or more vessels and barges comprising an onboard battery bank system with a battery charging system, said onboard battery bank system to include plethora of batteries arranged as a series of connections to furnish electricity to one or more vessel system components; and said power control system further configured, when employed, to shunt net power, via cable connections, to moored vessels and barges.

In one aspect the hybrid energy system comprises a vessel and a barge comprising an offshore kinetic energy turbine farm including a hybrid energy array of said one or more piezoelectric arrays, wind turbine arrays, and solar panel arrays and a power plant headquarters, said power plant headquarters to systematically manage operations of said kinetic energy turbine farm.

In one aspect the hybrid energy system comprises a buoy system comprising: one or more off-shore buoy devices either fixed or mobile, said one or more off-shore buoy devices; and a buoy anchoring system set in ground below water level.

In one aspect the hybrid energy system comprises a motorized system comprising at least one propeller, and an autonomous self-driving system, and a gyroscopic leveling system.

In one aspect the hybrid energy system comprises an onboard battery bank system with a battery charging system to connect with a vessel and said onboard battery bank system providing added weight for buoyancy beneath and at water level, and a plethora of batteries arranged as a series of connections to furnish electricity to the vessel components.

In one or more aspects the hybrid energy system comprises one or more receivers, transmitters, and microprocessors comprising cell phone satellite communication capability, telecommunication, and microchip processors and to thus manage system operations from HES network headquarters.

In one aspect the hybrid energy system comprises a wireless communication processor, said processor configured for providing vessel to vessel communication, said control system further comprising; a sensor array, GPS, and the hybrid energy system, a network comprising satellite communication, WIFI and a signaling interface, global networking comprising satellite communication, and a network control system comprising one or more wireless communication devices.

In one aspect the hybrid energy system comprises a shunting subsystem, said shunting subsystem comprising an off-shore grid transmission control system, and an underground power cable network control system, and said off-shore grid transmission control system for distributing net power to onshore to utility companies and a consignment operation to rent giant battery bank containers.

FIG. 1A illustrates a configuration of the kinetic energy turbine comprising one generator 5. When high velocity momentum is detected the turbine controller 13 manages an electromagnetic link coupling 8 can be engaged to crank and brake the shaft 4.

FIG. 1B illustrates a configuration of the kinetic energy turbine comprising convex blades. Also, an electromagnetic link coupling 8 is to engage or disengage generator rotor 5 and with the blade rod 4. When high velocity momentum is present the turbine controller 13 manages an electromagnetic coupling switch to link coupling 8 with the shaft of the ratcheting gearbox 9 as shown by arrow to increase RPM's.

FIG. 1C illustrates a configuration of the kinetic energy turbine comprising controller 13 to manage a gear box housed within a nacelle 10. The gearbox controller shuts down the electric magnetic coupling to prevent damage to the gearbox. The electromagnetic link coupling 8 and generator 5 are protected by encasement. The unit may include an optional collapsing handle 27.

FIG. 1D illustrates a configuration of the kinetic energy turbine comprising a hydroelectric turbine having heavy duty blades with protective coating and submersible generators 5, and having wire array 6, and supporting armature frame 1, cable 11, and bracket 12. The method of operation is to manage the operation for hydroelectric turbine functions wherein, the hydroelectric turbine controller 13, wherein preferred sensors detects kinetic energy driven turbines are activated by forced elements.

In greater detail FIG. 2A illustrates a flowchart for Hybrid Energy System site 93 energy producing operations.

Method 1:

The network mainframe processor controller 13 having satellite communication and comprising cell phone satellite communication capability, telecommunication, and microchip processors and to thus manage from HES network headquarters.

Method 2:

The network mainframe processor controller 13 having cell phone satellite communication capability, and telecommunications, GPS and preferred sensor array 13 and thus, the control system 13 can send surplus energy to on site electrical components and can shunt extra power to the grid.

Method 3:

The network mainframe processor controller having cell phone and satellite communication monitored by network telecommunication, microprocessors, GPS, and sensor array 13.

Method 4:

The network mainframe processor to manage the operations of power production systems working and the functions to produce electric energy.

Method 5:

The network mainframe processor to manage the operations for producing energy from photovoltaic, wind and kinetic energy.

Method 6:

A HES array anchored and placed horizontally or perpendicularly in group alignment for energy production.

Method 7:

The network mainframe processor to manage the operations of one or more HES arrays placed on ground, above ground on buildings and infrastructure, on and offshore vehicles, vessels, airplanes for energy production.

Method 8:

The network mainframe processor to manage the operations of one or more wind turbine arrays and solar panel arrays for energy production.

Method 9:

The network mainframe processor to manage the operations of one or more operations of hydroelectric turbines for energy production.

(Method 10:

The network mainframe processor to manage the operations of hybrid vehicles for energy production.

Method 11:

Hybrid Energy System 93 comprising wherein: frame 1, axis rod 2, blade type 3, shaft 4, generator 5, electrical wiring 6, bearing coupling 7 electromagnetic link coupling 8, gear box 9, nacelle encasement 10, cable suspension 11, bracket 12, controller having GPS/cellular communication 13, conduit pipe 14, structure compartment with access means 15, vent guard 16, turbine valve device 17 including controller 13, kinetic energy turbine array 18, or KET array 18 conveyer system 19, debris claw 20, forced substance 21, piezoelectric device with crystals 22, flexible coating 23, piezoelectric array 24, piezoelectric pipe valve controller 25, portable wind turbine power system 26, collapsing handle 27, battery array 28, portable battery caddy with controller charger having GPS 29, hybrid solar power and wind turbine telescope device 30, solar panel or film 31, motorized rotational device 32, actuator telescoping device 33, stand 34, veranda/colonnade 35, hybrid building/structure 36, turbine window unit 37, forced air duct for turbines and piezoelectric devices 38, hybrid renewable energy turbine array 39, tower 40, infrastructure pipeline 41, hydroelectric aqueduct 42, aqueduct tunnel 43, dam turbine array 44, spill stream or river 45, wave or tidal turbine array 46, eddy 47, buoy 48, insulated cable and plug 49, network grid cable 50, hybrid mega barge 51, a mega vessel for an offshore kinetic energy power production 52, a power plant merchant headquarters 53, offshore hybrid energy array 54, submarine vessel 55, robotic armature 56, overpass, underpass or bridge 57, piezoelectric array and vented housing 58, turbine array in vented housing 59, a tunnel 60.

Figure 3:
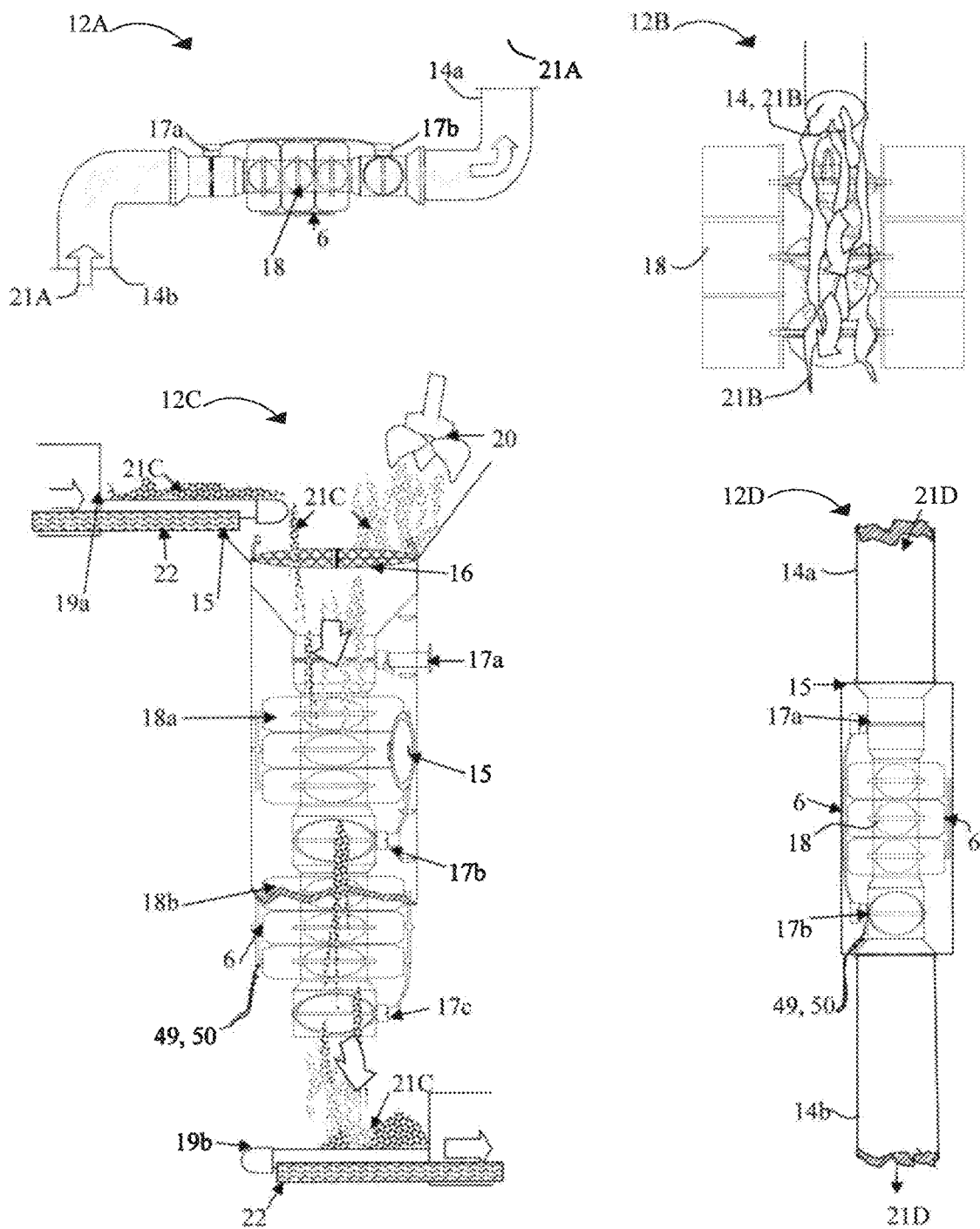
FIG. 3 show perspective configurations of kinetic energy piezoelectric device methods.

Referring now in greater detail FIG. 3A shows various mobile kinetic energy turbine arrays that can be set under a pipe 14 and as illustrated water or liquid which forcefully activates blades crank generators rotors. The pipe array can be transported autonomously.

In greater detail in FIG. 3B as illustrated water or 21B liquid which forcefully activates blades 3 crank generator rotors. The kinetic energy turbine array 18 can be transported by an autonomous cart and accordingly power can be stored in battery bank 28.

Referring now in greater detail in FIG. 3C, the hybrid energy system illustrates a configuration of a turbine valve device with gasket flange 17. The kinetic energy turbine "KET" 18 comprises at least three turbine units having desired blades. The kinetic energy valve is managed by a device controller having GPS 13 and the pipe 14 which can be contained within compartment with an access hatch 15. A funnel vat empties into a vent guard 16 allows forced matter to drop into the KET array. An autonomous pipe valve with controller having cell phone and satellite communication can be monitor by the network. When a malfunction happens, a sensor signals the controller to shut valve flange.

Figure 4:
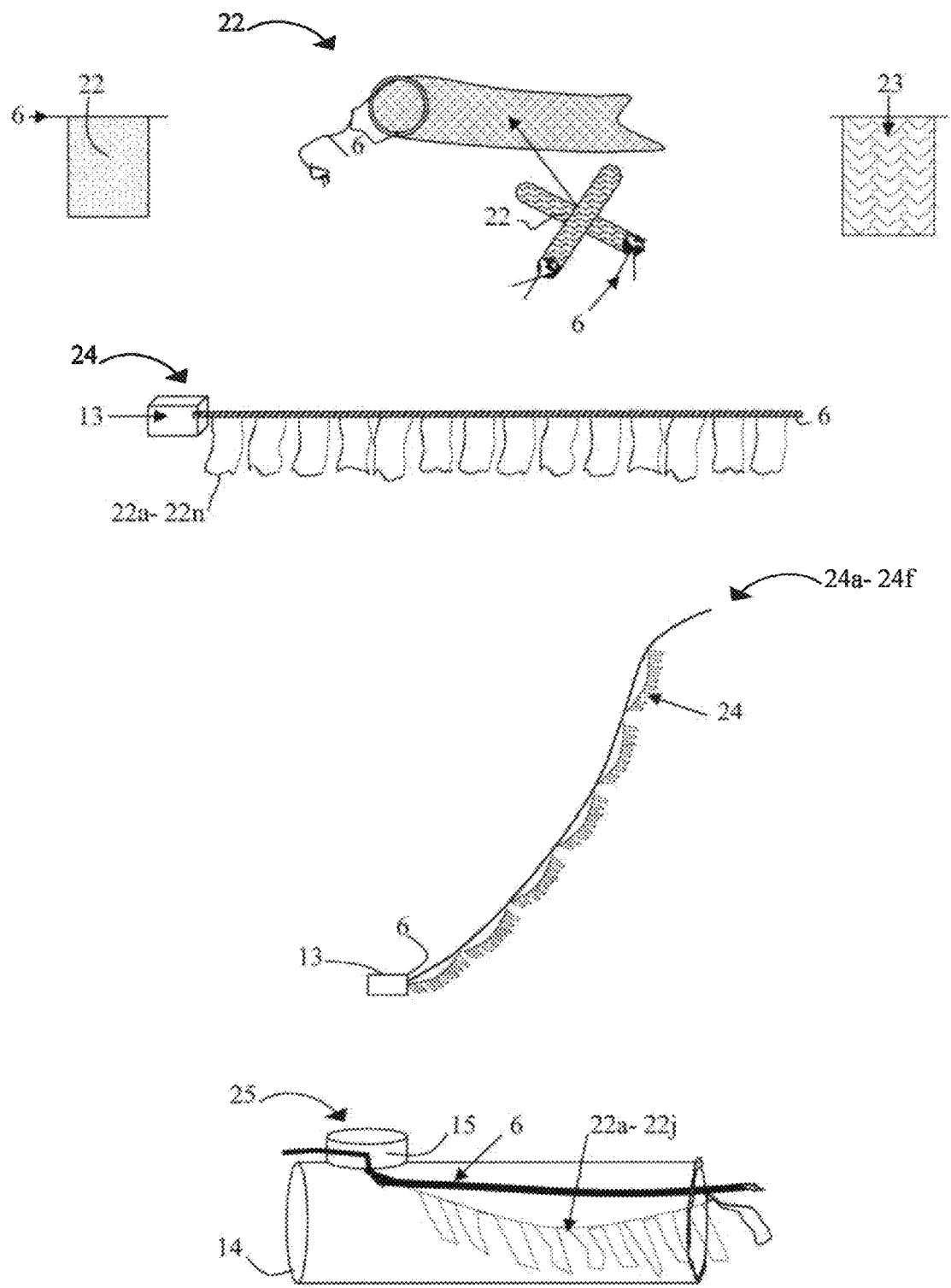
FIG. 4 shows perspective configurations of kinetic energy force to activate turbine blades for pipe and valve applications.

Referring now in greater detail in FIG. 4, the hybrid energy system illustrates various piezoelectric devices and application methods, piezoelectric device with crystals 22, a plausible flexible coating 23, piezoelectric array 24, piezoelectric pipe valve with controller having cell phone and satellite communication 25, a portable wind turbine power system 26.

An array of piezoelectric devices activated by wind, water, also by pressurized force, said piezoelectric devices work inside pressurized pipes, and inside a vented housing, in pipelines, building air ducts, and air conditioning systems, said piezoelectric array further comprising wire 6 connecting to an array of control system sensors.

The conveyer system 19 allows matter flow to spill out onto the vent guard and fall onto blades. A debris claw 20 allows forced matter and ingredient substance 21 to dump out onto blades and fall though to exit downwardly.

The hybrid energy system methodologies whereby comprising: one or more piezoelectric devices, one or more piezoelectric arrays, one or more wind turbine units and one or more solar panel devices, and respectively one or more piezoelectric devices, one or more piezoelectric arrays, one or more wind turbine units and one or more solar panel devices to produce hybrid energy for buildings, buildings characterized to include single story homes, condominiums and skyscrapers, and a means for a battery bank system with plug in access for on demand power, the battery bank system controller comprising a wireless control system having cell phone interface control and satellite communication. Other methodologies include: a kinetic energy method comprising various piezoelectric devices can be activated by wind, water, also by pressurized force.

As well, said piezoelectric devices work in novel applications such as set inside pressurized pipes, and inside a vented housing, and in pipelines placed accordingly.

A building with air ducts and an air conditioning system can integrate the piezoelectric array to generate electricity power, said piezoelectric array further comprising wire 6 connecting to an array of control system sensors.

Referring now in greater detail in FIG. 4, the hybrid energy system illustrates a configuration of various piezoelectric devices and application methods, piezoelectric device with crystals 2, a plausible flexible coating 23, piezoelectric array 24, piezoelectric pipe valve with controller having cell phone and satellite communication 25, a portable wind turbine power system 26.

A kinetic energy method comprising various piezoelectric devices can be activated by wind, water, also by pressurized force. As well, said piezoelectric devices work in novel applications such as set inside pressurized pipes, and inside a vented housing, and in pipelines placed wherever. A building with air ducts and an air conditioning system can integrate the piezoelectric array to generate electricity power, and wire 6 connects to control system sensors placed wherever suited to see that an operational activity is being carried out.

Figure 5:
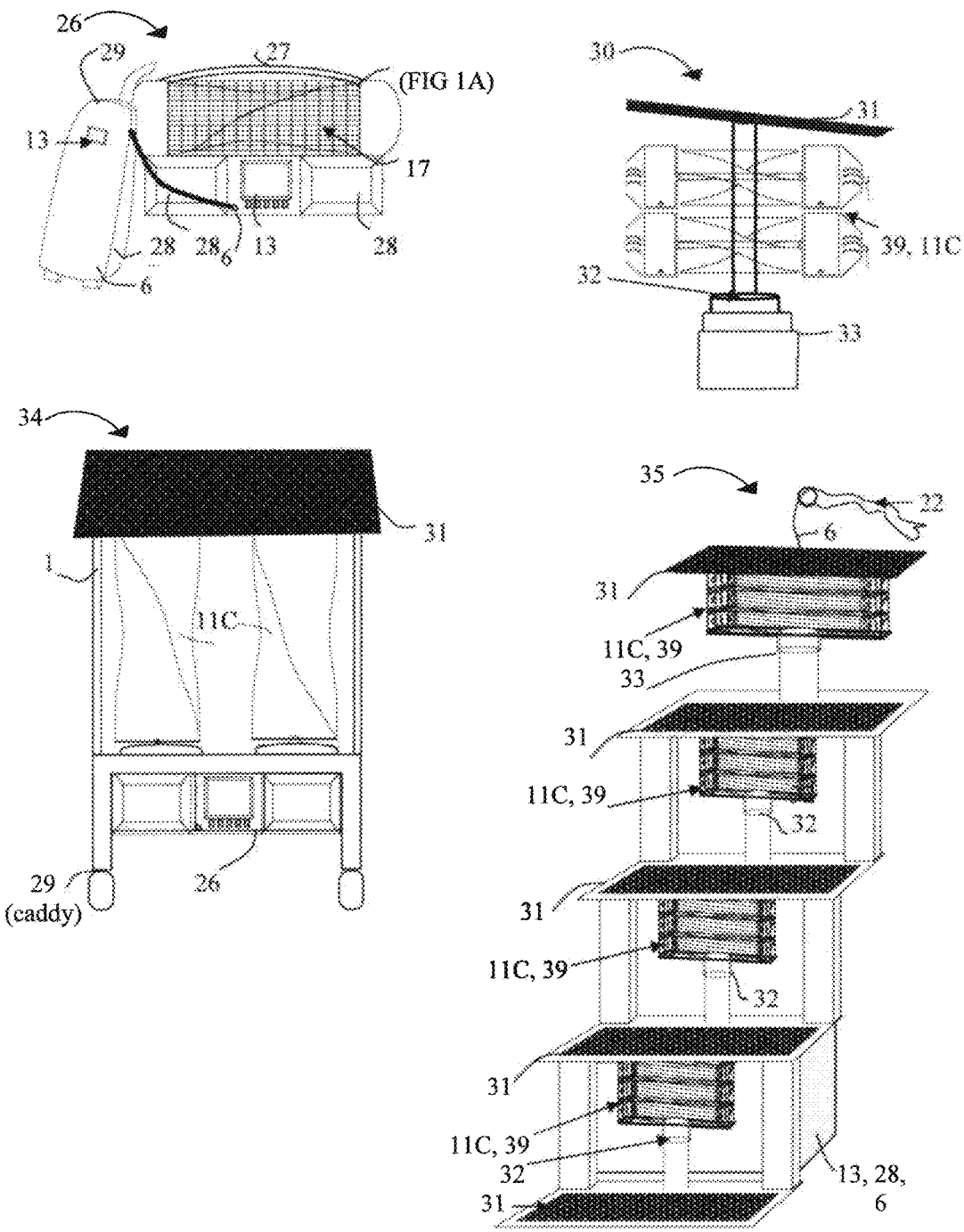
FIG. 5 shows perspective configurations of various portable wind turbine units, a portable snap on solar power device, and a configuration of a stacking modular tower.
Figure 6:
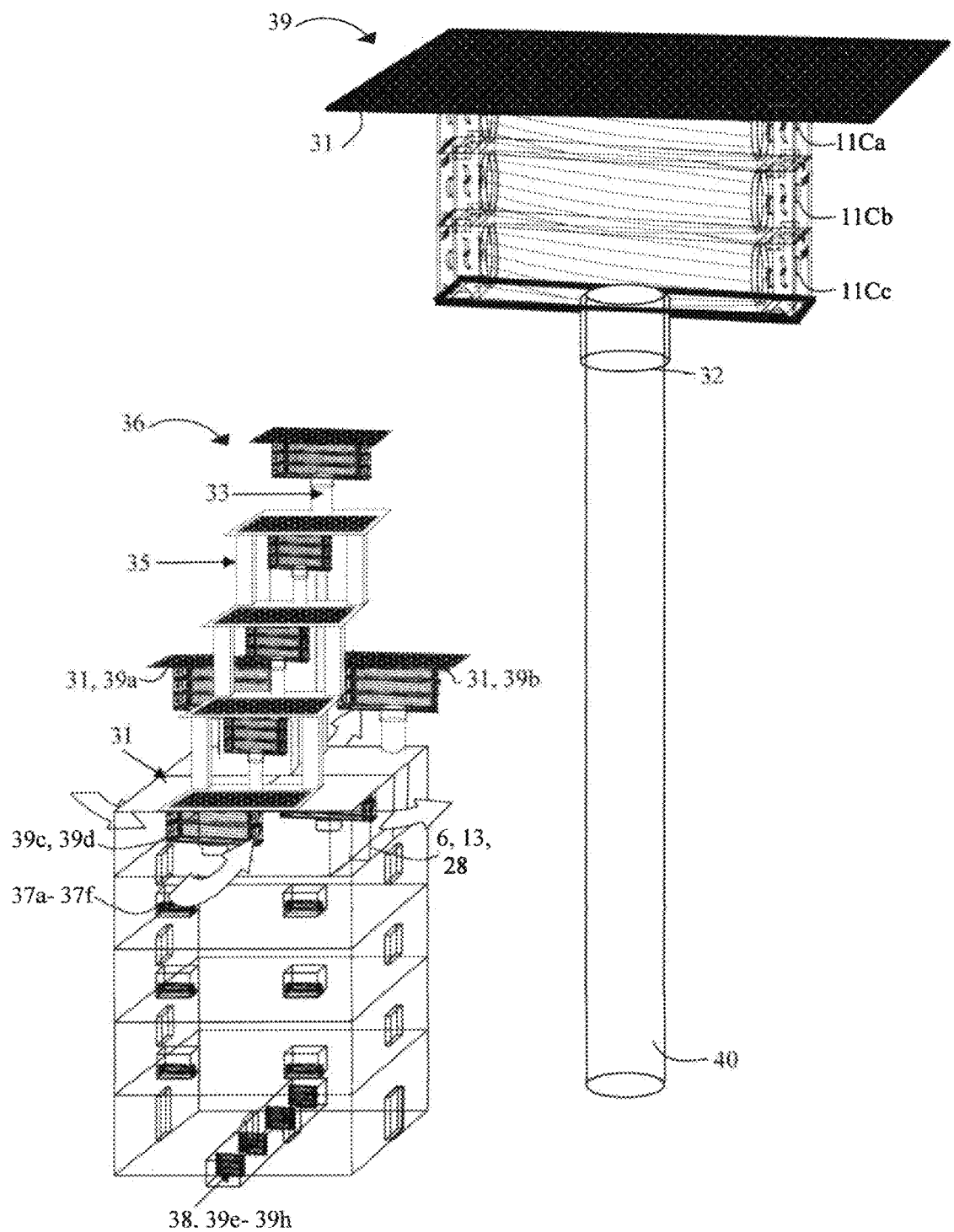
FIG. 6 shows perspective configurations of a giant hybrid wind turbine array with a giant solar panel.

Referring now in greater detail in FIG. 5 and in FIG. 6 the hybrid energy system illustrates wind turbine units shown in FIGS. 1A-3C integrated with modular hybrid renewable energy methods for the wind turbine array 39 integrated onsite with solar panel or film 31 for energy production.

FIG. 5 shows a portable wind turbine power system 26 with vent guard 16 includes a collapsing handle 27, at least two 12V batteries 28 and a portable battery caddy 29 with a controller having GPS 13 with cable plug, outlet and inlet and wire 6 arrays with sensors.

FIG. 5 shows the modular hybrid solar power stand or wind turbine telescope device 30 includes a solar panel or film 31, and a motorized swivel device with microchip control 32, and an optional actuating telescoping device 33.

FIG. 5 shows a modular hybrid solar power and wind turbine telescope device 30 comprises a pole having a motorized telescope device 33 which sets as a pinnacle of a roof, a building, infrastructures, and can set on a vehicle roof.

FIG. 5 shows a portable stand 34 supporting the wind turbine power system 26 is including a solar panel 31 that snaps on and off, at least two 12V batteries 28, and having a preferred anchoring method.

FIG. 5 also shows a modular awning 35 can be stacked vertical to stack one above the other as offset to piggy back which exposes solar panels better, each stackable modular awning comprising a system that is prefabricated in awning sections gapping which allows concentrated wind speed to directly across each wind turbine unit as depicted in FIGS. 1A, 1B, and in 1C and activates the turbine's blades 2. The stackable modular awning comprising of multiple piezoelectric panels, wind turbine units and solar panel devices arrays can be set on a mega barges and mega vessels as illustrated in FIG. 8B. The modular awning can also be set in aligned groups in horizontal direction which can be parallel, or to be set in multiple rows, as well the alignment can be curved or connected to complete a ring formation.

FIG. 5 shows a plurality of modular awnings 35 are to set on the ground, as well as to set on the roof of a skyscraper, a building, and on land turbine farms also sited wherever else suited.

FIG. 5 shows various portable wind turbine units which may or may not include a portable snap on solar power device that can comprise a controlled motor with sensors to automatically adjust by actuating to tilt and swivel into the direction of the sun.

Referring now in greater detail in FIG. 6, the hybrid energy system illustrates a configuration of various kinetic energy turbine devices and application methods on and in a building 36 with stacking modular awning(s) 35.

FIG. 6 shows a hybrid building 36 which includes the wind turbine array integrated with and solar power 31 arrays. Accordingly, the hybrid energy system wind turbine and solar panel array can be sited differently than this building illustrates.

FIG. 6 shows a configuration of the wind turbine array 39 which can be set adjacent to a building 36 site. The wind turbine 39 comprises at least one wind turbine unit (shown in FIG. 1). As shown a wind turbine array is a stacking array numbered as 39 which sets upon a giant motorized tower 40.

The wind turbine tower 40 automatically swivels into the wind via a controller motor 32.

Accordingly giant wind turbine farms can employ wind turbine array supported by giant towers. The HES site 93 depiction for a wind turbine farm may be set on and off-shore.

Referring now in greater detail FIG. 7, the hybrid energy system illustrates a configuration of perspective configurations of hydroelectric infrastructure for a pipeline 41 and an aqueduct above ground 42, and an aqueduct below ground 43.

The configuration for a pipeline 41 is shown integrating turbine valves 17, and piezoelectric pipe inserts 25, and system pipe 14 without a device. The pipe is housed underground or is housed on a preferred site such as at a factory supplied by pipeline systems.

The underground pipeline 41 harnesses the insulated wire 6 and sensor array, not shown. The pipeline 41 also accommodates and houses underground network power grid cable 49.

Figure 7:
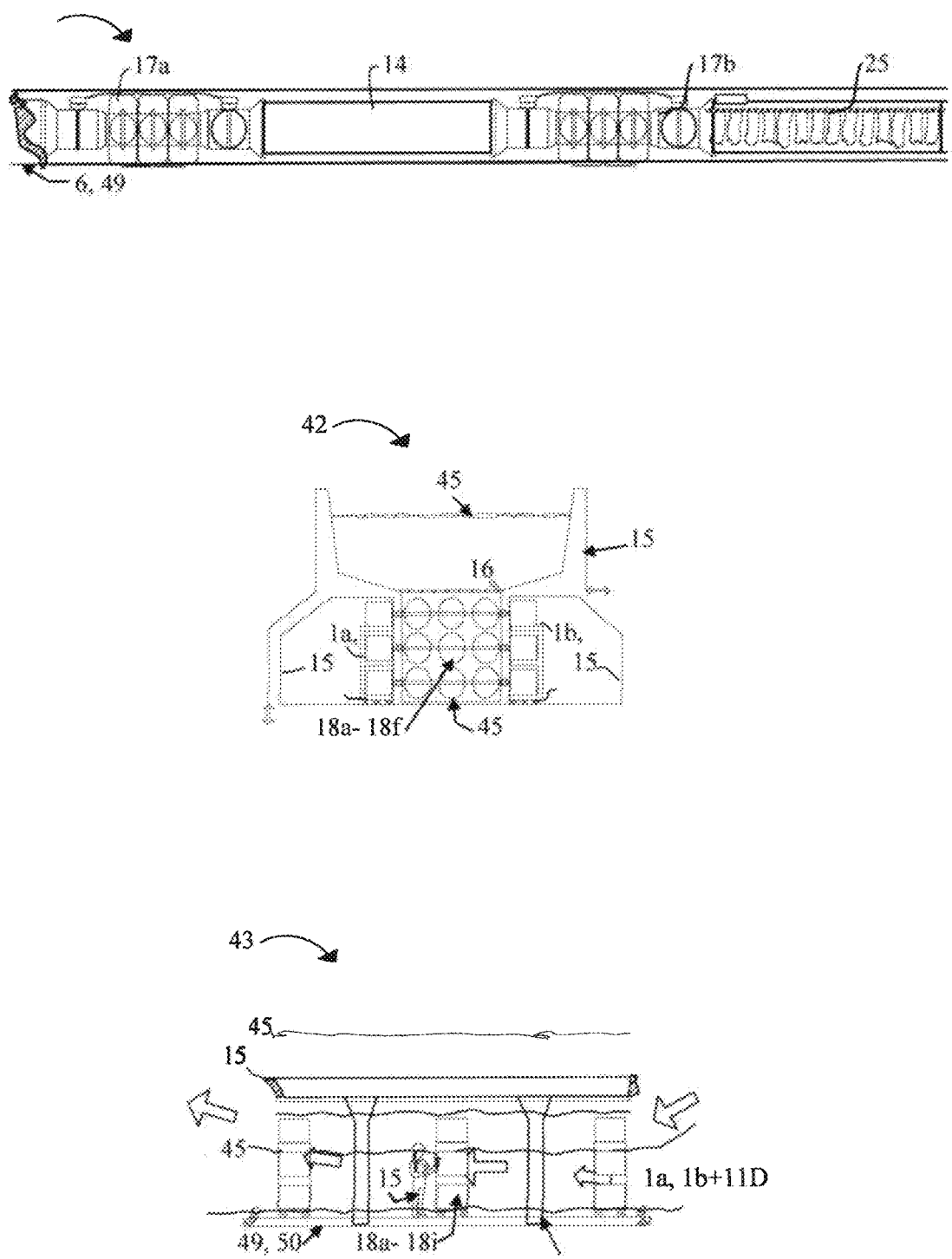
FIG. 7 shows a perspective configuration of infrastructure pipeline integrating hydroelectric and piezoelectric systems which are above and below ground level aqueduct, and work also as thermoelectric power stations.

FIG. 7 the hybrid energy system illustrates an aqueduct site 42. The hydroelectric turbine array 18 is supported by armature frame 1, which can be wheeled around to access via internal structure 15 right or 15 left.

As shown a vent guard 16 allows the maintenance worker access and is eco friendlier for fish. The generators are set on the internal side 15 and the water flow 45 is channeled to turn the hydroelectric turbine array 18 generators and blades 1.

As shown in FIG. 7 the hybrid energy system illustrates an aqueduct below ground 43. The hydroelectric system is set underground where water is natural forced to enter and exit as shown by the arrows. The subterranean aqueduct 43 is ideally suited to be placed under rivers and streams, and an aqueduct above ground 42 the subterranean aqueduct 43 is supported by a pillar frame 1.

The internal structure 15 allows the maintenance worker access and a vent guard is set vertically at the aqueduct entrance. The generators are set on the internal side 15 and the water flow 45 is channeled to drive the hydroelectric turbine array 18 generators and blades.

Figure 8:
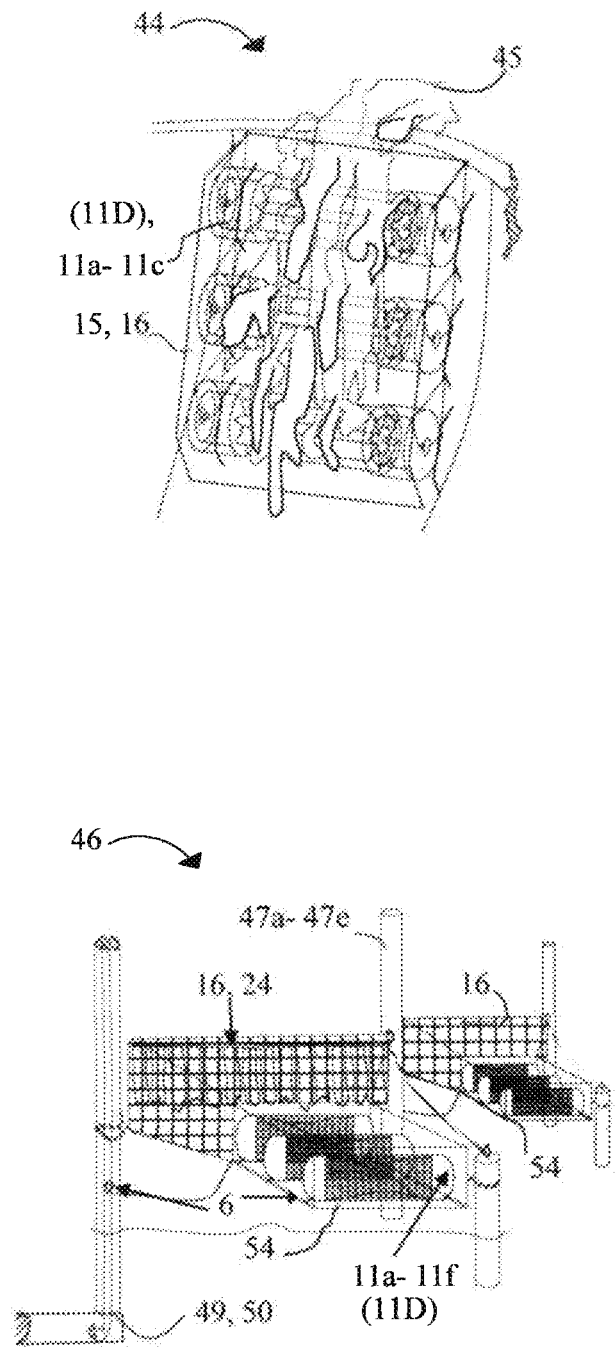
FIG. 8 shows two perspective configurations of a hybrid energy method for a dam or spillway, and for rivers, streams, and for coastline tidal and wave sites.

Referring now in greater detail FIG. 8, the hybrid energy system illustrates a configuration of a dam 44 with or spillway. The hydroelectric turbine having heavy duty blades with protective coating and sealed generator referenced in FIG. 1D is anchored or is suspended by cable and thus directly set in the spill flow 45. Network cable 49 and 50 being protected by site system conduit accordingly.

As shown the control system 13 sends surplus energy to on site electrical components and can shunt extra power to the grid. A hydroelectric aqueduct can be dams and spillways above ground and tunneled underground. A hydroelectric turbine array can be set on a beach to capture wave and tide force.

As shown in FIG. 8, a configuration of a wave that impacts and activates the tidal turbine array 46 anchored off-shore by eddy 47. The underground network cable 49 and 50 is buried beneath as shown cut through. A floating buoy pilling can stabilize a wafting tidal turbine array 46 anchored on the water surface 46 or on a spillway, and on rivers and streams docks or ocean side piers and locks.

Figure 9A:
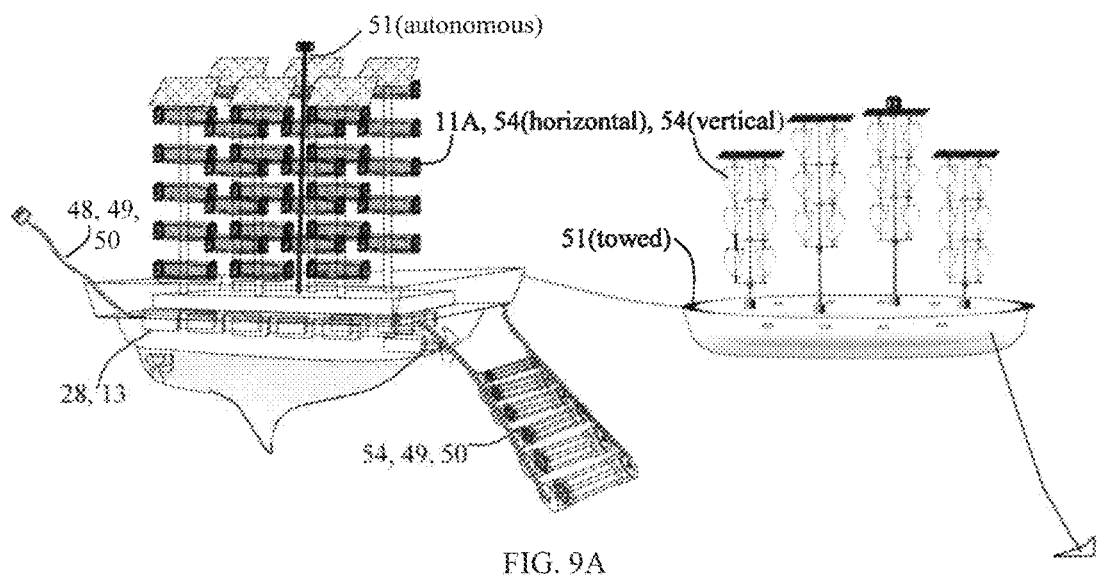
FIG. 9A shows a perspective configuration of hybrid energy system integrated with an off-shore business enterprise and an off-shore power plant system having various hybrid energy devices which operate on and below the ocean surface.
Figure 9B:
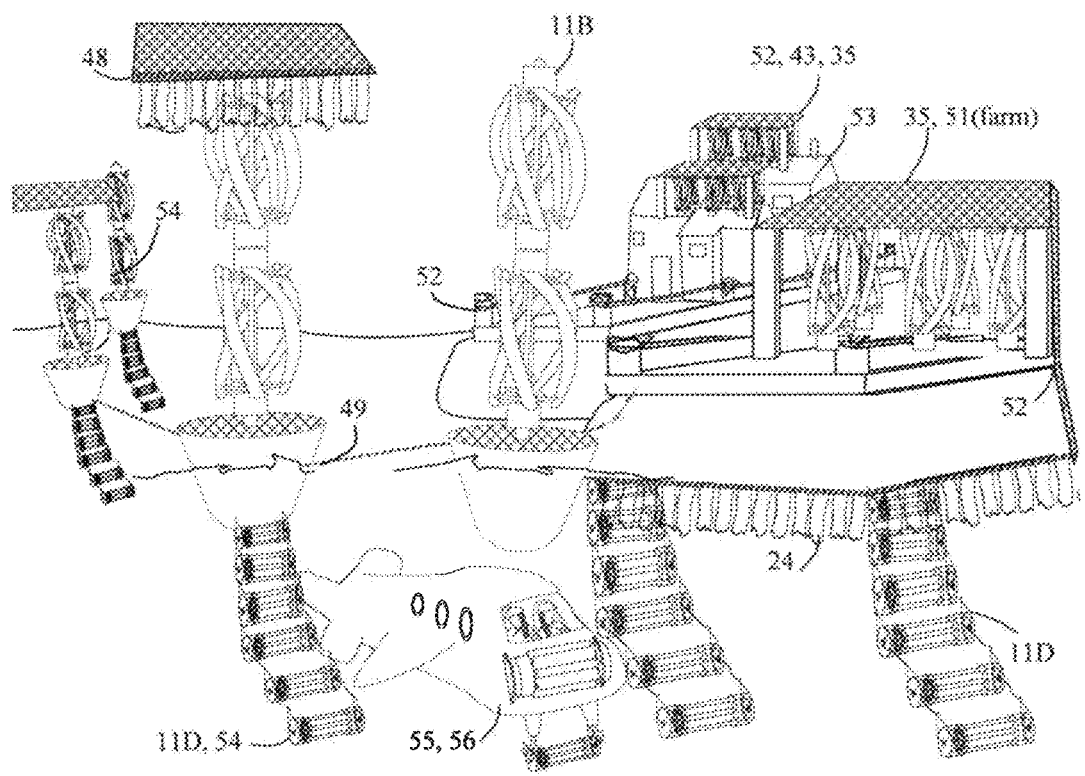
FIG. 9B shows an offshore service station.

Referring now in greater detail FIG. 9A and FIG. 9B, an offshore application, as depicted the hybrid energy system illustrates hydroelectric energy producing methods for tidal hydroelectric energy producing methods and in FIG. 9A, hybrid vessel 51 includes said control system 13 that manages the battery charging process which extends long range mileage for said vessel, and shunts power to another vessel or shunts extra power to a grid network.

Shown in FIG. 9A a mega barge 51 also includes a wind turbine array 39 and solar power panels, and the motorized tower 31, hydroelectric turbine housing 54 which is towed, and vent guard 16 protect the propeller 56, and also insulated wire 6 and cable 49 subsequently connects with network grid cable 50. A control system 13 sends surplus energy to on site electrical components and can shunt extra power to a grid network.

Shown in FIG. 9B, a mega vessel 52 shows an off-shore hybrid power plant integrated with an off-shore business enterprise. An off-shore service station and battery charge methods to extend long range mileage for a vessel or mega barge, and accordingly said control system 13 sends surplus energy to onsite electrical components and the controller shunts power to a grid network.

The hybrid energy system comprising novel hydroelectric mega vessels comprising a utility grid transmission system which stores net power in battery containers and battery pods to consign net power.

An off-shore grid network of FIGS. 9A and 9B comprising a grid transmission network control system which collaborates with said mega vessels and barges to stock pile net power onboard in a battery said container and controls the container devices pending outcrop shipment.

The vessel system of FIGS. 9A and 9B characterized in that to store net power and sales off-shore energy production to a utility company and comprising: an off-shore energy production shunting subsystem comprising an ocean underground power cable network control system.

In one aspect one or more an off-shore grid transmission control system which shunts net power underground sea to shore via a large-scale cable network system which distributes net power to on shore applications accordingly for profit, and shunts net power to other off-shore vessels for emergency power.

In one aspect one or more mega-barges to produce net power in battery bank containers to ship to utility consignment locations.

In one aspect one or more vessels to dock inland and dock off coastlines to shunt net power to utility grid companies and ship battery containers globally.

An off-shore grid company transmits electrical energy underground sea to shore cable system to distribute net power on-shore accordingly. The mega vessel of FIG. 9B garages a novel hybrid submarine which is employed for underwater hydroelectric power system monitoring and maintenance. An off-shore headquarters 53 and an off-shore power plant system 52 having various hybrid energy devices; piezoelectric array 24, hybrid solar power and wind turbine telescope device 30, kinetic energy turbine array 39, buoy tower 48, charging store 64, and with insulated cable and plug 49 which subsequently connects with network grid cable 50.

The buoy system of FIG. 9B comprising one or more piezoelectric arrays, the wind turbine system to also include one or more solar panel devices, and having a gyroscopic leveling system and a water pressure configured to measure water pressure and to generate a depth signal indicating a depth of the apparatus in a body of water; and wherein the processor is further configured to receive the depth signal from the water pressure sensor to detect a situation when the depth of the apparatus exceeds a predetermined depth.

The buoy system of FIG. 9B is characterized in that of an off-shore buoy device is either fixed or is mobile to include at least one or more devices and processes including: a mega-sized buoy device, a buoy anchoring system, cabled to fastened and set in ground below water, a motorized system comprising at least one propeller independent having its own means of propulsion, an autonomous self-driving system, and an onboard battery bank system with a battery charging system, the buoy to connect with a vessel, and the onboard battery bank system to add weight for buoyancy is to set beneath water level, a plethora of batteries arranged as a series of connections to furnish electricity to the vessel, and the mobile the buoy having a gyroscopic leveling system.

The sub vessel 55 of FIG. 9B maintenances the turbine farm with robotic armature devices 56 is shown to be clasping on to hydro-turbine FIG. 1D underneath the sub vessel 55 which operates in the ocean surface.

Figure 10:
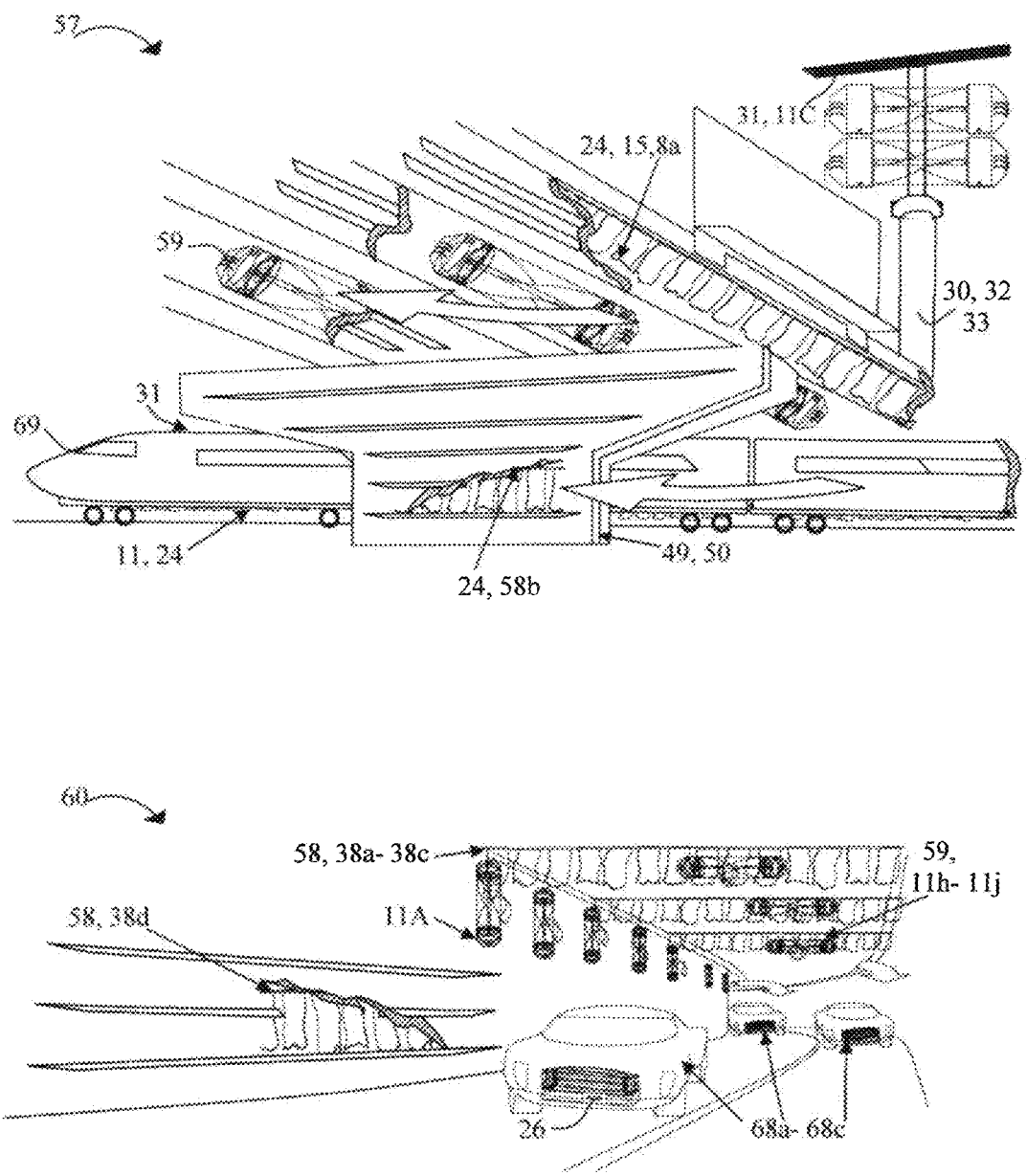
FIG. 10A shows a perspective configuration of the hybrid energy system integrated with overpass and underpass site.
FIG. 10B shows a perspective configuration of the hybrid energy system integrated within a tunnel.

As shown HES sites can work as shown method in the FIG. 10 depiction of overpass and underpass 57. The overpass and underpass are shown as comprising wind turbine solar power panel 31, 33 piezoelectric panels 24 are sited in a vented housing with ducts. A HES site for a highspeed rail train 69 depicts the action to cause turbulent activity to activate the turbine units thereby generating electric energy for the (HSR) train power and for neighboring sites.

As shown in FIG. 10 a construction method configured for a tunnel 60 comprising an array of HES piezoelectric panels 24 housed in the ceiling structure. A cut through view shows the ceiling and the wall 15 having said elongated vented ducts and the wind turbine unit FIG. 1C which are housed in the ceiling and wall ducts. A control system 13 method sends surplus energy to onsite electrical components and can shunt extra power to the grid.

The site's tunnel lights and pumps are powered by generators and piezoelectric devices activated by kinetic energy air turbulent (eddy's shown by arrows 47). The electric cars 68 show the portable wind turbine unit 26 is set inside the front boot to extend long range mileage.

Figure 11:
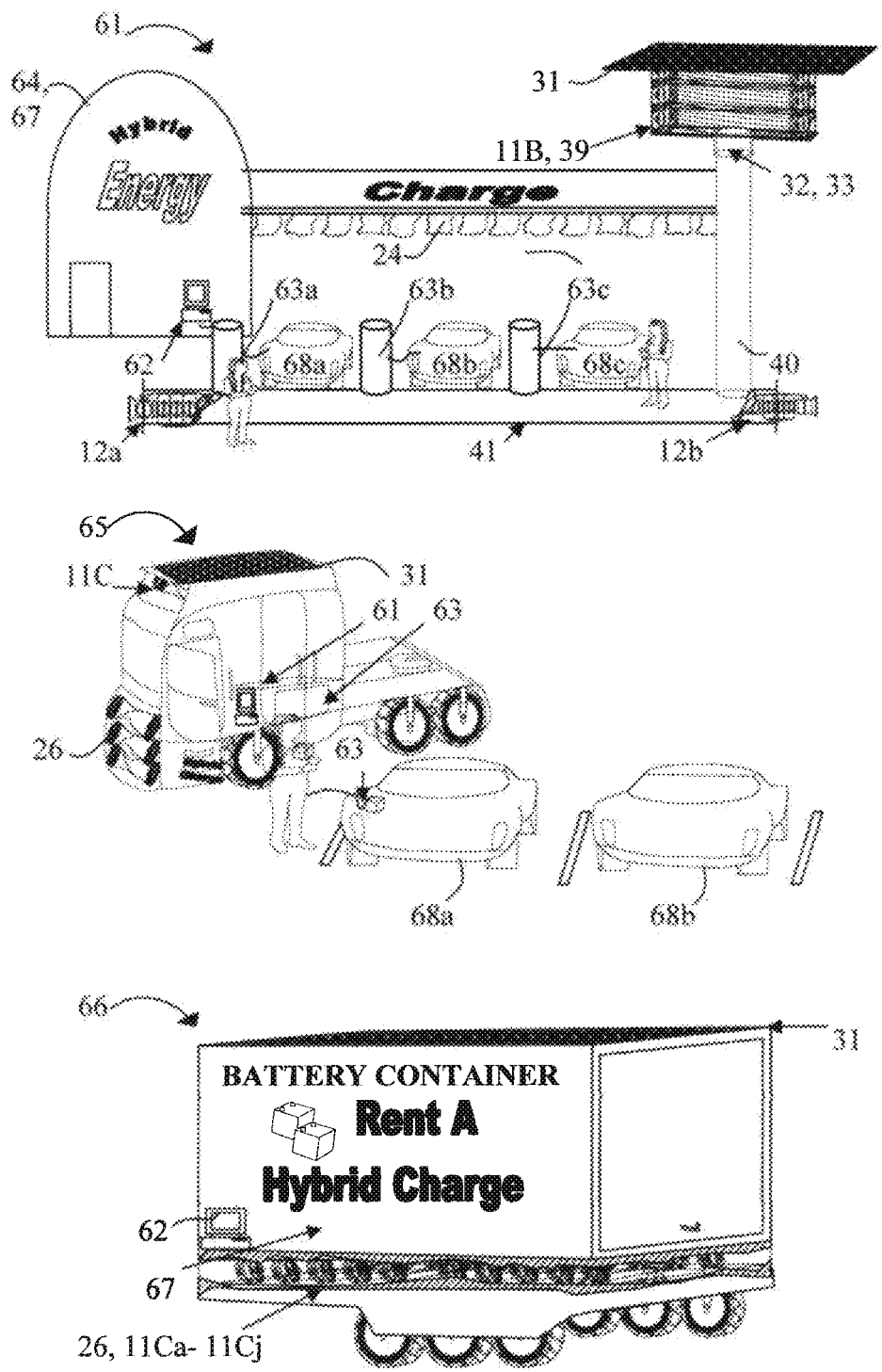
FIG. 11 illustrates perspective configurations of the hybrid energy system for service stations and battery charge methods for energy consignment.

Referring now in greater detail FIG. 11, the hybrid energy system illustrates perspective views of a hybrid energy powering station and battery bank consignment and battery charge methods including portable wind turbine systems 26 to set up on site to charge an electric vehicle's 68 and extending mileage.

The hybrid energy site 61 for commercial service stations ship generated power to rural and metro homes, buildings, and to communities on and off grid power. Accordingly, a vehicle type can utilize the renewable energy power system and wind turbine apparatus in various ways for consumer applications and electrical components indoors and out.

One or more wind turbine apparatus can be anchored in any given manner with and without a vented housing, and placed accordingly such as horizontally or perpendicularly, to stack, or be in a group alignment inside and outside the vehicle cab and vehicle body with utility vehicle 65 and commercial vehicle 70.

The HES kinetic energy power service station 61 site can be situated over an underground water treatment plant and pipe network system 41 with said valves, and wind and solar array solar panel or film 31, motorized rotational device 32, actuator telescoping device 33, stand 39 and a giant tower 40. As well, the station is self-service store 64 which houses the battery 67. The station is self-service store 64 also stores and sells portable charge containers 67 which can be consigned by a business to charge employee vehicles at work and thus container remains on site until nearly spent upon the next replacement scheduling via automated control system 62 with payment such as a Pay Pal system.

An automated control system 62 and payment system, and a plug-in charge port 63, and provide as service application by shipping and delivering, exchanging and recycling spent battery's for fully charged batteries.

As shown, a utility vehicle 65 provides a service which is on call or via an appointment in order to charge and recycle spent electric vehicle batteries as the depictions showing the car 68 is being charge in a parking lot as controller 62 automatically manages charge plug-in portal 63, and also battery 67 storage level.

FIG. 11 plausibly a HES service utility trailer 66 can deliver a fully charged battery container to homes, businesses, and hospitals and when power is nearly depleted, the hybrid energy system controller 62 can automatically schedule.

Referring now in greater detail FIG. 11, a hybrid energy system illustrates a commercial vehicle 70 and service which can ship generated power to rural and metro homes, buildings, and to communities on and off grid power.

Accordingly a vehicle type can utilize the renewable energy power system and said wind turbine apparatus array work in various ways for consumer applications such as shipping and delivering, exchanging and recycling spent batteries for fully charged battery array 81.

A vehicle can include the HES piezoelectric flag 33, solar panel 31, and the HES automated control system 62 and payment system to plug-in charge port 63.

Figure 12A:
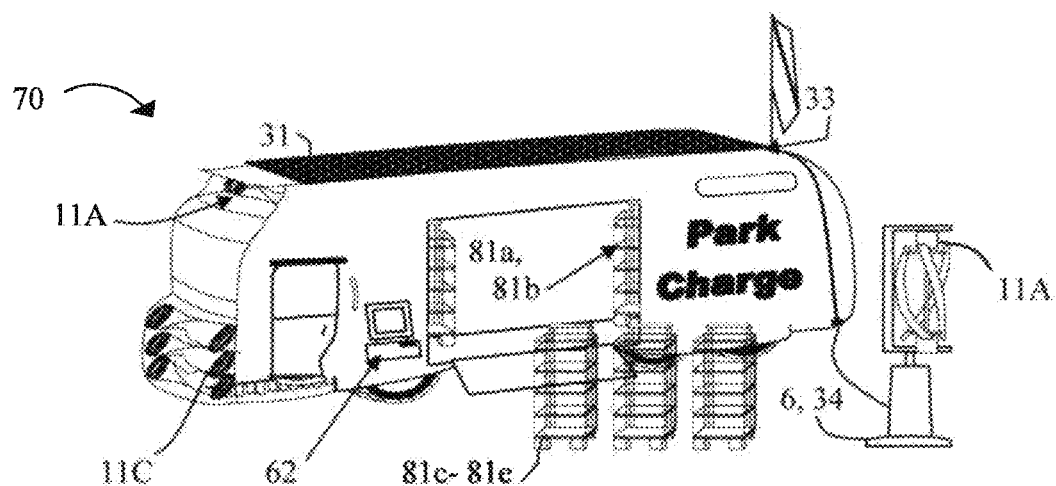
FIG. 12.
Figure 12B:
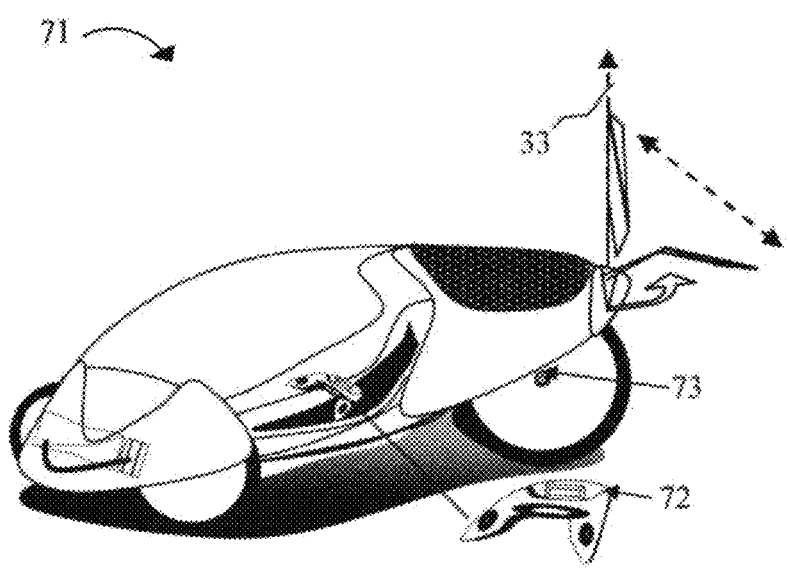
Figure 13A:
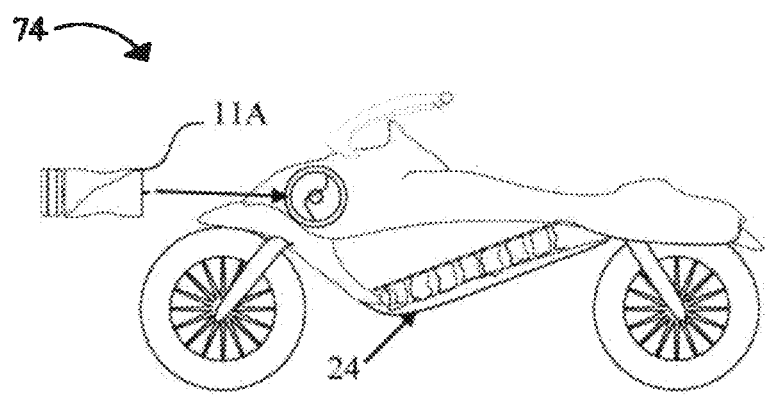
FIG. 13A, and FIG. 13B show a perspective configuration of hybrid energy vehicles.

Referring now in greater detail FIG. 12, FIGS. 13A and B illustrates a configuration of a hybrid energy vehicle 71 with electric motor 78 and motorized wheels 73, a piezoelectric robotic armature device that is activated when vehicle is started.

FIG. 12 the Pod car comprises HES controller manages a telescoping actuator that opens a door hatch 33 (depicted by arrow) allows piezoelectric flag 23 to pop out, and when parked to lower back down and shut the door hatch. A vehicle type may or may not include the door hatch device 33 to rise upward and out. The hand-held remote controller 72 acts as a steering wheel and a foot pedal stops the motorized wheel 73.

Figure 13B:
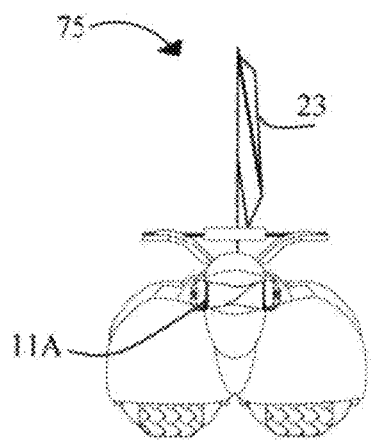

Referring in greater detail FIGS. 12, 13A and 13B can employ a hybrid energy system for vehicles; a pod car, a motorcycle, a golf cart, and all-terrain vehicles (ATVs).

As shown, FIG. 13A is a HES motorcycle 74 is a utility terrain vehicle and a cart too that can employ at least one or more wind turbine arrays FIG. 11A. A vehicle controller 13 can furnish HES net power to motor(s) 78 and components inside and outside the vehicle body, and said system works to extends vehicle's long-range mileage until parked for battery recharging process. The motorcycle may or may not include piezoelectric flag 24.

FIG. 13B shows an ATV 75 comprising one wind turbine apparatus FIG. 11A can be anchored in any given manner with and without a vented housing and placed accordingly such as horizontally and extends an electric vehicle's long-range mileage until parked for battery recharging process.

Figure 14:
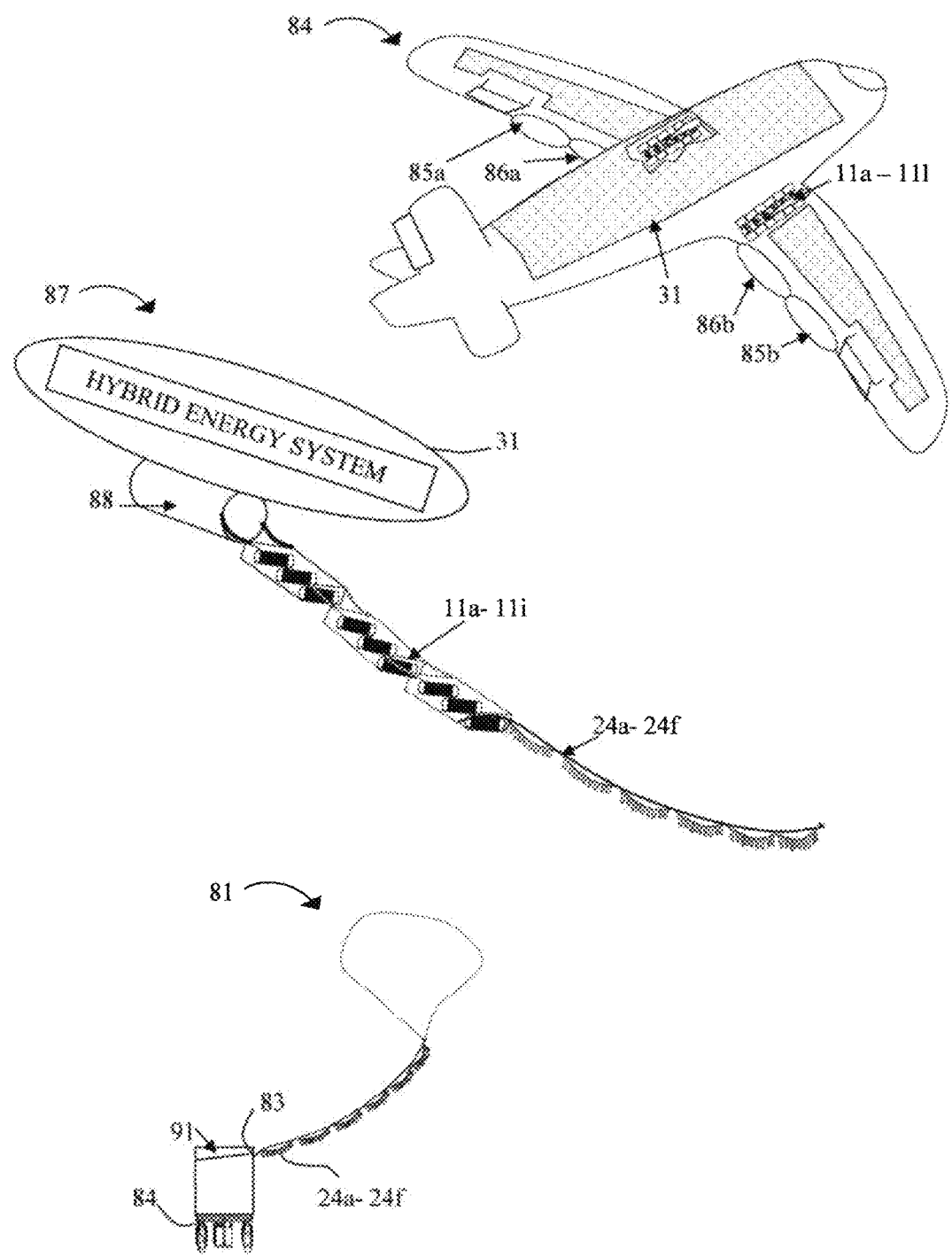
FIG. 14 shows a perspective configuration of various an airplane and inflatables.

FIG. 14 illustrates various airplanes, blimps comprising wind turbines floating below, and as well including mounted solar panels or film, and an air balloon with a piezoelectric array is floating or hanging off the wind turbine tower.

As shown FIG. 14 discusses a plausible method for the HES method for a blimp 80 which can carry passengers or just operate as a remote-controlled blimp 80 as illustrated. The blimps balloon may comprise solar film 31 (as shown in white background color).

Plausibly the wind turbine array 39 and piezoelectric devices 24 can be towed in the air to produce hybrid energy ideally for buildings, and is commercial renewable energy source to power homes, businesses via cable line 49.

Figure 15:
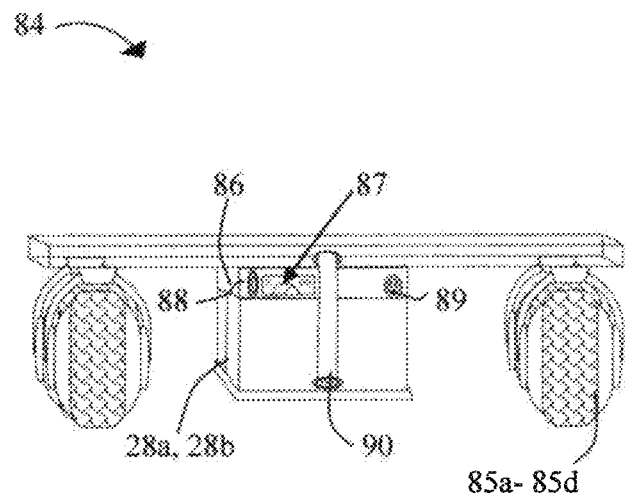
FIG. 15 shows a perspective configuration of an autonomous battery charging cart system.
Figure 15:
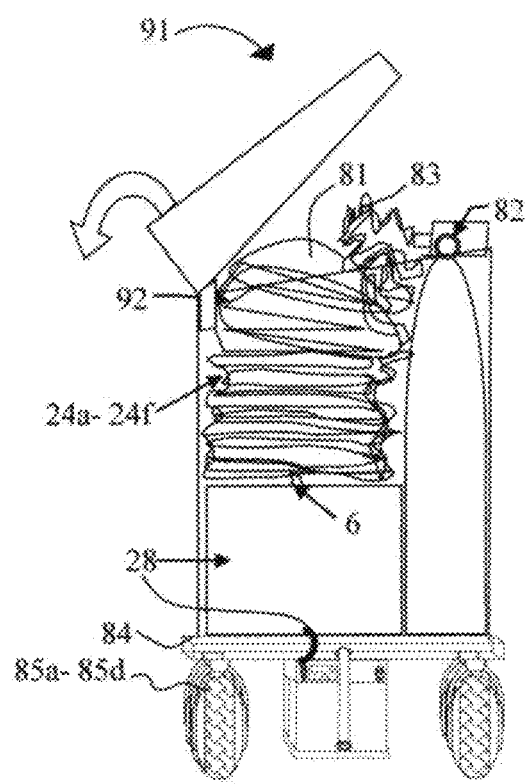

As shown in FIG. 15 discusses plausible method for also shows an autonomous carrier 91 that is to anchors on a piezoelectric inflatable 81, and thus the tether cable with a power wire harness 83 then connects to helium tank with controller 82 can inflate the balloon 81 which is managed accordingly.

An autonomous cart base 84 comprising wheels or motorized casters 85, and a cart controller 86 with battery charger, a gauge 87, an in source 88 and outsource power outlet 89, and a battery housing 90. An autonomous carrier 91 includes a door hatch comprising a controller 92. While parked an autonomous carrier 91 receives instructions from said controller 92 to open the door or flip door closed.

Accordingly FIG. 15 as shown, the HES site comprises a method for the autonomous cart controller shunts helium from tank 82 and inflates the balloon 81 it ascends upward and out of the autonomous carrier compartment 91. The piezoelectric inflatable power wire harness 83 connecting piezoelectric devices 24 ascend.

Accordingly FIG. 15 as shown, HES site comprises a method for the wind to activates piezoelectric devices 24 and produces energy, a controller 86 charger manages voltage and shunts net power to autonomous cart base 84 with batteries 28. During this charging activity this autonomous carrier 91 receives instructions from said controller 82 to close the door hatch 92 via an electric motor 78 until battery if fully charged afterwards the helium tank autonomously shuts off via controller 82 and balloon 81 deflates.

Accordingly FIG. 15 as shown, HES site comprises a method for the autonomous cart base 84 comprising wheels or motorized casters 85 is instructed via controller to shut down. The balloon is gathered by a maintenance worker and thus process is repeated at other sites.

The above mentioned as specified in generic terms may not be technologically precise and most of the devices and components can be purchased on the marketplace. It is apparent to those skilled in the art that many more entailed nuances are possible within the scope of the invention.

The invention claimed is:

1. A hybrid energy system (HES) for on-shore and off-shore applications comprising:
   one or more of; a piezoelectric array, a wind turbine array, a solar panel array, or a combination thereof to produce electric energy on one or more site applications;
   a power control system including battery bank, said power control system for managing electric energy production and energy storage;
   a power cable network control system for power distribution;
   a wireless communication system;
   a wireless controller comprising satellite communication and I/O devices;
   a control system comprising processors an array of sensors for controlling mechanical functions and navigational operations.

2. The system of claim 1 in which said one or more piezoelectric arrays further comprising:
   one or more piezoelectric devices, said one or more piezoelectric devices comprising a flexible composite make formed in various shapes and sizes to produce electric energy.

3. The system of claim 1 in which said wind turbine array further comprising:
   a framework supporting a dual axis rod, bearing couplings, said dual axis rod comprising opposing ends coupled to a first generator and to a second generator, one or more blade arrangements for activating generators, and an electrical wiring array having connection plugs.

4. The system of claim 1 in which said site applications comprising: homes, buildings, infrastructure, vessels and vehicles utilizing one or more piezoelectric arrays, wind turbine arrays, solar panel arrays, or a combination thereof to produce electric energy.

5. The system of claim 1 in which said infrastructure further comprising: dams, aqueducts, roadways, overpasses, bridges, and tunnels, an underground water treatment plant and pipe network system.

6. The system of claim 1 in which said site applications further comprising: mega-sized vessels, barges and buoys, and hybrid energy power station and an off-shore power plant.

7. The system of claim 1 in which an application comprising: vehicles being land-based or airborne: said vehicles configured having one or more piezoelectric arrays, a wind turbine arrays, a solar panel arrays, or a combination thereof to produce electric energy.

8. The system of claim 1 in which said vessel further comprising: one or more hybrid energy system arrays to produce hybrid energy.

9. The system of claim 1 in which said vessel further comprising: a manual drive control system, or a semi-autonomous drive control system, or an autonomous drive control system.

10. The system of claim 1 in which said autonomous drive control system further comprising:
 processors for controlling propulsion;
 a wireless control system comprising WIFI, a wireless controller comprising cell phone with signaling interface linking with said global networking system;
 GPS satellite mapping;
 LIDAR, RADAR and object detection sensors;
 an array of video and camera devices.

11. The system of claim 1 in which said vessel further comprising:
 an onboard battery bank system with a battery charging system, said onboard battery bank system and said power control system to furnish electricity to one or more vessel components;
 a control system, said control system for managing vessel's operational functions.

12. The system of claim 1 in which said vehicle further comprising:
 a manual drive control system, or a semi-autonomous drive control system, or an autonomous drive control system;
 I/O wireless communication devices including cell phone interface;
 said power control system comprising a battery bank system with a battery charging system.

13. The system of claim 1 in which said control system further comprising:
 a sensor array;
 processors and microprocessors;
 GPS,
 one or more receivers, transmitters and WIFI;
 a cell phone device comprising signaling interface;
 a network control system comprising one or more wireless communication devices;
 a global networking system comprising satellite communication;
 a net power subsystem, said net power subsystem comprising an off-shore grid transmission control system linking to an on-shore grid transmission control system;
 an ocean based underground power cable network control system;
 said off-shore grid transmission control system for distributing net power to onshore to utility grids;
 a consignment operation to rent giant battery bank containers;
 an automated control system with a payment system.

14. A buoy system comprising:
 one or more buoy devices, said one or more buoy devices comprising:
 an anchoring system;
 a gyroscopic leveling system;
 an onboard battery bank system with a battery charging system, said onboard battery bank system providing buoyancy at water level;
 a power control system comprising a power cable for power distribution;
 said one or more buoy devices comprising one or more piezoelectric arrays, wind turbine units, solar panels to produce electric energy;
 a wireless controller comprising satellite communication, wireless controller for controlling said piezoelectric array operations, said wind turbine array operations, said solar panel array operations;
 GPS, WIFI, a wireless communication system linking to a global networking system for controlling buoy system operations.

15. A hybrid energy system for general applications comprising:
 a frame;
 bracketing parts;
 a wiring array;
 a caster wheel array for portability;
 one or more modular wind turbine units and solar panels;
 a compartment, said compartment for housing wherein; a battery bank, a battery charger, a power control system, and one or more wiring connections and inlet/outlet plugins;
 said power control system managing power and power distribution;
 a wireless communication system linked with cell phone interface.

* * * * *